2,831,838
NOVEL POLYMERIZABLE COMPOUNDS

Frank Fekete, Tonawanda, N. Y., assignor to Pittsburgh Plate Glass Company, Allegheny County, Pa., a corporation of Pennsylvania No Drawing. Application March 21, 1956
Serial No. 572,810

10 Claims. (Cl. 260—80)

This invention relates to novel phosphonium type compounds, and to the preparation thereof, and pertains more specifically to the reaction of tetrakis-hydroxymethyl phosphonium halides with the alkali metal salts of unsaturated monocarboxylic acids, to produce novel phosphorus containing monomers which homopolymerize, or interpolymerize with other monomeric materials to give useful polymers.

It is known that the $CH_2=C<$ linkage in unsaturated monocarboxylic acids such as acrylic acid or methacrylic acid is quite reactive, and the free acids, as well as the esters thereof, are frequently utilized as one component of polymerizable mixtures. It is also known that the presence of phosphorus in a polymer appears to enhance to a considerable extent the flame retardant properties thereof.

It has now been discovered that it is possible to combine in a single novel monomer the reactive properties of the unsaturated monocarboxylic acid and the fire retardant properties of phosphorus. This is accomplished in accordance with the present invention by reacting an alkali metal salt of an unsaturated monocarboxylic acid with a tetrakis-hydroxymethyl phosphonium halide. In the reaction the alkali metal atom combines with the halogen atom of the phosphonium type compound to form an inorganic metal salt, with the residue of the unsaturated monocarboxylic acid attaching to the carbon atom of the phosphonium compound from which the halogen atom is removed. The reaction is believed to proceed substantially as follows, wherein tetrakis-hydroxymethyl phosphonium chloride and potassium methacrylate are utilized for illustrative purposes:

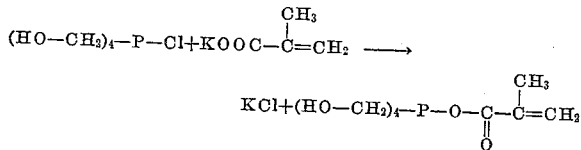

The novel compounds prepared by reactions of the type depicted structurally above possess the following structure:

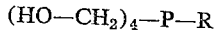

wherein R is the radical derived by removing the carboxyl hydrogen atom from an unsaturated monocarboxylic acid such as methacrylic acid or acrylic acid. Compounds of this structure polymerize readily in the presence of catalysts such as the peroxygen compounds to form hard, clear homopolymers, or can be polymerized with other monomers such as styrene and the like to give interpolymers with many useful properties, the most important being outstanding fire retardation. It is also possible to admix the novel compounds of this invention with a polyester, for example, a polyester of adipic acid, diethylene glycol and glycerol, and a diisocyanate such as toluene diisocyanate, which mixture forms a good rigid foam with excellent fire retardant properties. Such foams are useful for insulation and other purposes.

Any unsaturated monocarboxylic acid may be utilized in the reaction with tetrakis-hydroxymethyl phosphonium halides in accordance with this invention. As indicated, acrylic acid and methacrylic acid in the form of an alkali metal salt such as the sodium or potassium salts, are particularly preferred, primarily because both are available at relatively low cost. However, other unsaturated monocarboxylic acids may also be utilized, such acids including crotonic acid, oleic acid, and the like. The reaction may also take place when the free acid is utilized although with some difficulty and not ordinarily to the extent it does when the acid salt is employed.

The tetrakis-hydroxymethyl phosphonium halides are generally solid materials, and it is accordingly desirable that the reaction be carried out in a solvent utilized in an amount such as to provide a readily stirrable reaction mixture. Suitable solvents include the alcohols such as methyl, ethyl, or propyl alcohol and the like, or more active solvents such as dimethyl formamide or dimethyl sulfoxide. No catalyst is necessary since the reaction takes place rapidly and exothermally when the reactants are brought together at temperatures as low as room temperature. In fact, it is desirable that the temperature be kept below about 50° C. in order that substantial condensation of the hydroxyl groups of the phosphonium compound, or polymerization of the unsaturated monocarboxylic acid salt does not take place to any substantial degree. It is also desirable that a polymerization inhibitor be included in the reaction mixture in order to prevent substantial polymerization of the unsaturated monocarboxylic acid and/or the polymerizable product. Suitable inhibitors for this purpose include hydroquinone, pyrogallol, tertiary butyl catechol, and the like.

As indicated hereinabove, one mole of the unsaturated monocarboxylic acid salt is required stoichiometrically to react with one mole of the tetrakis-hydroxymethyl phosphonium halide. However, the reaction may also be carried out utilizing less than a mole of the acid salt per mole of the phosphonium halide, or by utilizing a large excess of either reactant, although no particular advantage is obtained when other than substantially stoichiometric quantities are employed.

As the reaction proceeds, the inorganic salt forms and generally precipitates from the reaction mixture. The desired product can be recovered readily by first filtering off the inorganic salt, and then removing the solvent medium by evaporation or distillation, or by adding a solvent such as toluene or the like in which the product is soluble and which forms a separate layer from the solvent utilized in the reaction. The product layer is removed by decantation and the toluene or other solvent containing the product is then removed by evaporation or by a simple distillation to give the final product, ordinarily as a fairly viscous light brown liquid. Other conventional means for recovering the product from the reaction mixture can also be used.

The monomeric compounds obtained by the process described hereinabove polymerize readily in the presence of a small quantity of a catalyst such as a peroxygen compound to give homopolymers which are hard and strong, and which, as indicated hereinabove, are unusually flame retardant. In a similar manner, these monomers can be admixed with other monomeric materials in the presence of a catalyst and heated to give interpolymers which also possess many useful properties including the excellent flame retardation of the homopolymers.

Among the monomers which can be polymerized with the new compounds of this invention to form interpolymers are the following: methyl acrylate, ethyl acrylate, butyl acrylate, isobutyl acrylate, hexyl acrylate, octyl acrylate, styrene, vinyl toluene, maleate esters such as dibutyl maleate, diallyl itaconate, acidic materials such as acrylic acid, methacrylic acid, maleic anhydride, vinyl ethers, vinyl pyridines, allyl acetoacetates, glycidyl acrylates, methacrylamide, dimethylbenzyl methacrylate, durenediol dimethacrylate, diallylidene pentaerythritol, and the like.

Among the catalysts which may be utilized to prepare either the homopolymers or interpolymers containing the novel monomers of this invention are the following: acetyl benzoyl peroxide, hydroxyheptyl peroxide, benzoyl peroxide, methyl ethyl ketone peroxide, cyclohexanone peroxide, cyclohexyl hydroperoxide, 2,4-dichlorobenzoyl peroxide, t-butyl hydroperoxide, methyl amyl ketone peroxide, acetyl peroxide, lauroyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate and the like. The diazo compounds, such as p-methoxyphenyl diazo-thio-2-(naphthyl) ether may also be used as polymerization catalysts, as may actinic light. Redox catalyst systems can be varied considerably; however, in most instances it is desirable to utilize from about 0.1 percent to about 2.0 percent based on the total monomer weights.

The polymerization can be carried out in mass, that is, simply by heating the monomer or monomers in the presence of a catalyst, or if desired, the polymerization can be conducted in a solvent for the monomer or monomers, or in an aqueous emulsion. Chain modifying agents or chain terminators such as the mercaptans, and particularly dodecyl mercaptan, as well as other additives conventionally utilized in polymerization reactions can be employed.

The following examples illustrate in detail the preparation of novel monomers by the reaction of tetrakishydroxymethyl phosphonium halides with unsaturated acids or salts thereof, and the polymerization of such monomers to form homopolymers and interpolymers. The examples are not intended to limit the invention, however, for there are, of course, numerous possible variations and modifications.

Example I

Sixty-three and one-half grams (1 mole) of tetrakis-hydroxymethyl phosphonium chloride and 45 grams of potassium methacrylate were admixed in sufficient dimethyl formamide to form a readily stirrable mixture. As the reaction proceeded the temperature rose exothermally to reflux for about 15 minutes. A quantitative yield of potassium chloride was formed, indicating complete coupling of the methacrylic acid with the phosphonium compound. Toluene was added whereupon two layers were formed, the toluene layer containing the product. The product layer was decanted and the toluene evaporated to give a nearly quantitative yield of tetrakis-hydroxymethyl phosphonium methacrylate of the structure

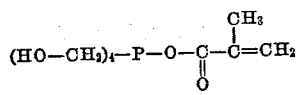

the compound being identified by bromine number, hydroxyl number and percent phosphorus.

Example II

Example I is repeated substituting potassium acrylate for the potassium methacrylate of Example I. A good yield of tetrakis-hydroxymethyl phosphonium acrylate is obtained.

Example III

Ten grams of tetrakis-hydroxymethyl phosphonium methacrylate are admixed with 0.5 gram of benzoyl peroxide and the resulting mixture heated for 5 minutes whereupon a hard, clear, flame retardant polymer is obtained.

A second sample of the tetrakis-hydroxymethyl phosphonium methacrylate, weighing 10 grams, is admixed with 5 grams of styrene and one gram of benzoyl peroxide. Upon heating polymerization occurs to form a hard, plastic material resistant to the action of flame.

Example IV

Eighty grams of tetrakis-hydroxymethyl phosphonium methacrylate was admixed with toluene diisocyanate and a polyester prepared from 16 moles of adipic acid, 18 moles of diethylene glycol, and 1 mole of glycerol, the components being utilized in the following amounts:

| Component: | Percent by weight |
|---|---|
| Polyester | 28.6 |
| Tetrakis-hydroxymethyl phosphonium methacrylate | 19.0 |
| Toluene diisocyanate | 52.4 |

The materials were stirred to give thorough mixing and after 3 minutes the reaction mixture became quite hot because of the exothermal reaction. Foaming occurred and the reaction mixture was placed in a square container. A hard, porous foam was obtained. The foam was checked for fire retardancy by placing pieces thereof in a flame. The foam burned when the flame was present but snuffed out instantly when the flame was removed. Only slight charring occurred.

When the above examples are repeated utilizing other unsaturated acids or acid salts, generally equivalent results are obtained.

Although specific examples of the invention have been set forth hereinabove, it is not intended that the invention be limited solely thereto, but to include all of the variations and modifications falling within the scope of the appended claims.

I claim:
1. A composition of matter comprising a compound of the structure

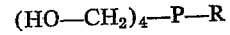

wherein R is the radical derived by removing the carboxyl hydrogen atom from an unsaturated aliphatic monocarboxylic acid containing 3 to 18 carbon atoms.

2. The composition of matter of claim 1 wherein the radical R is derived by removing the carboxyl hydrogen atom from a member of the class consisting of acrylic acid and methacrylic acid.

3. A composition of matter comprising tetrakishydroxymethyl phosphonium acrylate.

4. A composition of matter comprising tetrakishydroxymethyl phosphonium methacrylate.

5. A homopolymer of the composition of matter of claim 1.

6. An interpolymer of the composition of matter of claim 1 and at least one other polymerizable monomeric compound containing a terminal $CH_2=C<$ group.

7. An interpolymer of tetrakis-hydroxymethyl phosphonium methacrylate and at least one other polymerizable monomeric compound containing a terminal $CH_2=C<$ group.

8. The method which comprises reacting a tetrakis-hydroxymethyl phosphonium halide with an alkali metal salt of an unsaturated aliphatic monocarboxylic acid, containing from 3 to 18 carbon atoms whereupon chemical reaction occurs to form a composition of matter comprising a compound of the structure $$(HO—CH_2)_4—P—R$$

wherein R is a radical derived by removing the carboxyl hydrogen atom from said unsaturated aliphatic monocarboxylic acid.

9. The method of claim 8 wherein the reaction is carried out in a solvent and at substantially room temperature.

10. The method which comprises bringing together potassium methacrylate and tetrakis-hydroxymethyl phosphonium chloride in the presence of a solvent and at substantially room temperature, whereupon chemical reaction occurs to form a composition of matter comprising tetrakishydroxymethyl phosphonium methacrylate.

References Cited in the file of this patent

UNITED STATES PATENTS

| | | |
|---|---|---|
| 2,668,096 | Reeve et al. | Feb. 2, 1954 |
| 2,743,299 | Flynn et al. | Apr. 24, 1956 |